UNITED STATES PATENT OFFICE.

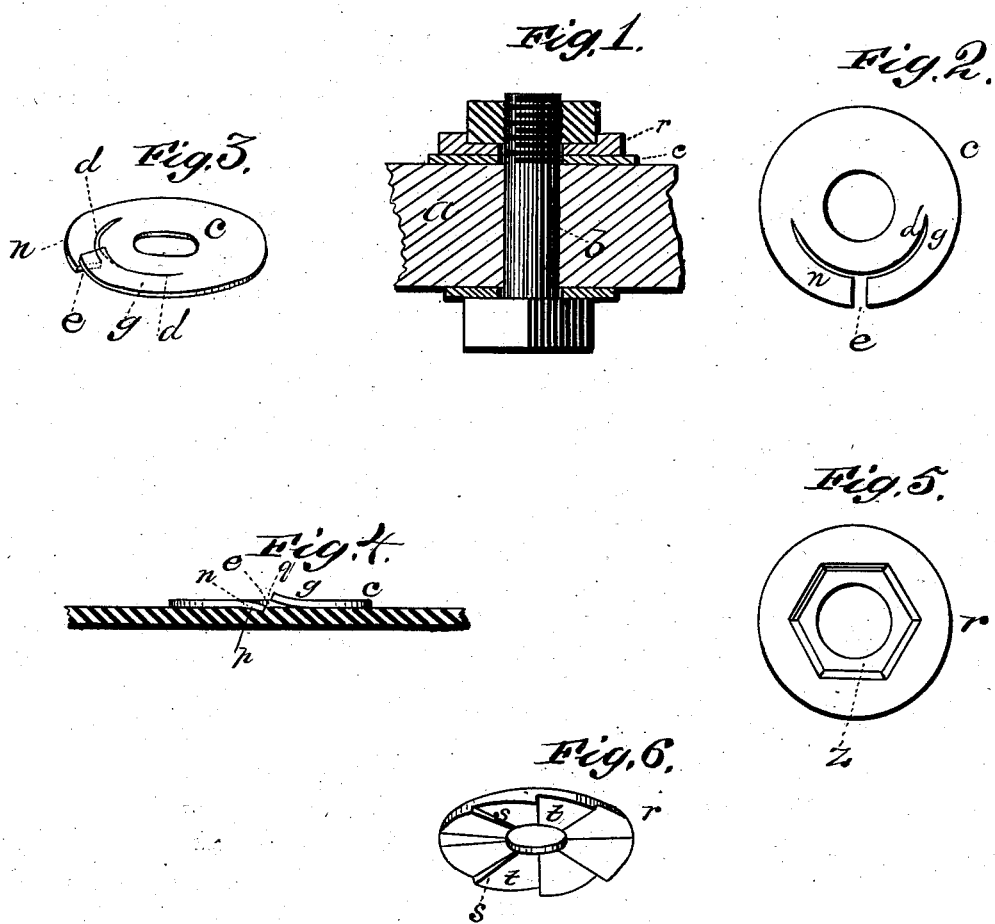

ANDERSON D. HOLLAND, OF JACKSONPORT, ARKANSAS.

SPRING-WASHER FOR NUT-LOCKS.

SPECIFICATION forming part of Letters Patent No. 260,684, dated July 4, 1882.

Application filed October 25, 1881. (No model.)

*To all whom it may concern:*

Be it known that I, A. D. HOLLAND, a citizen of the United States, and a resident of Jacksonport, in the county of Jackson and State of Arkansas, have invented a new and valuable Improvement in Spring-Washers; and I do hereby declare that the following is a full, clear, and exact description of the construction and operation of the same, reference being had to the annexed drawings, making a a part of this specification, and to the letters and figures of reference marked thereon.

Figure 1 is a vertical sectional view of the fish-plate, washer, ratchet-ring, and nut and an elevation of the bolt. Fig. 2 is a plan view of the spring-washer; Fig. 3, a perspective view of the same; Fig. 4, a side view of the spring-washer in place on the fish-plate; Fig. 5, a plan view of the ratchet-ring, and Fig. 6 a perspective view thereof.

This invention has relation to spring-washers; and it consists in the novel construction and arrangement of parts, as will be hereinafter fully described, and particularly pointed out in the claims.

In the accompanying drawings, the letter $a$ designates a fish-bar or other bearing through which the bolt $b$ passes.

$c$ indicates the washer, in which is made a concentric cut, $d$, extending from a radial cut, $e$, and forming a curved arm, $g$, which is raised above the face of the washer, the material of which is designed to have some elasticity, so that the arm will be a spring, usually of low tension. The washer $c$ has also a curved spring-arm, $n$, which extends from the radial cut $e$ in the opposite direction and is depressed below the lower or inner face of the washer, so that while the arm $g$ extends outward the arm $n$ extends inward from the plane of the washer. In the face of the fish-plate or bearing $a$ is formed by means of a beveled punch or other suitable instrument a beveled depression, $p$, having an abrupt end or shoulder, $q$, which, when the washer is applied over the bolt, is designed to engage the inner spring-arm, $n$.

$r$ indicates a ratchet-ring which is applied over the bolt on the washer. The inner surface of this ring is formed with radial teeth having shallow abrupt shoulders $s$ and long beveled faces $t$, and is designed to engage the outer spring-arm of the washer. Around the central aperture or bolt-hole of the ring $r$ is formed, in its outer surface, an internal shouldered recess, $z$, the wall of which is of hexagonal or other shape to conform to the outer contour of the nut $v$, which is seated in said recess and is engaged therewith.

In using this device the washer is first passed over the threaded end of the bolt, the ratchet-ring is next applied, and the nut is then screwed down, engaging the ratchet-ring by its shouldered recess and causing it to turn until the bolt is sufficiently tight. In this operation the ratchet-ring will pass over the spring-arm $g$ of the washer readily; but when the nut and ring are turned home the spring-arm will engage one of the teeth of the ratchet-ring, and as this ring is locked to the nut by its recess $z$ any reverse movement of the nut or its washer will be prevented.

When it is desired to loosen the nut the spring-arm $g$ should be bent down with a thin tool to allow the ratchet-teeth to pass over it when turned in the reverse direction.

It is apparent that the spring-arms $g$ and $n$ are formed by portions of the circumferential edge of the washer, and are respectively bent outward and inward.

Having described this invention, what I claim, and desire to secure by Letters Patent, is—

1. The washer $c$, having the slits $d$ and $e$ and the spring-arms $g$ and $n$ bent in opposite directions, substantially as specified.

2. The combination, with the washer $c$, having the slits $d$ and $e$ and the curved arms $g$ and $n$ bent in opposite directions from the plane of its face, of the ratchet-ring $r$, having the central recess, $z$, around the bolt-hole, adapted to fit the contour of the nut, substantially as specified.

In testimony that I claim the above I have hereunto subscribed my name in the presence of two witnesses.

ANDERSON D. HOLLAND.

Witnesses:
RICHARD M. DAVIS,
JOHN T. VERDELL.